(12) United States Patent
Kraus et al.

(10) Patent No.: US 7,842,766 B2
(45) Date of Patent: Nov. 30, 2010

(54) PHOSPHORUS-CONTAINING COPOLYMERS, METHOD FOR THE PRODUCTION THEREOF, AND USE THEREOF

(75) Inventors: Alexander Kraus, Evenhausen (DE); Harald Grassl, Schönau (DE); Angelika Hartl, Tacherting (DE); Martina Brandl, Traunstein (DE)

(73) Assignee: Construction Research & Technology GmbH, Trostberg (DE)

( * ) Notice: Subject to any disclaimer, the term of this patent is extended or adjusted under 35 U.S.C. 154(b) by 658 days.

(21) Appl. No.: 11/883,601

(22) PCT Filed: Feb. 24, 2006

(86) PCT No.: PCT/EP2006/001694

§ 371 (c)(1),
(2), (4) Date: Aug. 2, 2007

(87) PCT Pub. No.: WO2006/089759

PCT Pub. Date: Aug. 31, 2006

(65) Prior Publication Data

US 2008/0146700 A1 Jun. 19, 2008

(30) Foreign Application Priority Data

Feb. 25, 2005 (DE) .................. 10 2005 008 671

(51) Int. Cl.
*C08F 118/02* (2006.01)

(52) U.S. Cl. .................. 526/274; 526/319; 526/286

(58) Field of Classification Search .................. 526/274, 526/286, 319
See application file for complete search history.

(56) References Cited

U.S. PATENT DOCUMENTS

| 4,028,434 | A | 6/1977 | Konter et al. |
| 4,931,497 | A | 6/1990 | Engelhardt et al. |
| 5,011,892 | A | 4/1991 | Engelhardt et al. |
| 5,684,104 | A | 11/1997 | Funk et al. |
| 2007/0043190 | A1 * | 2/2007 | Kraus et al. .................. 526/319 |

FOREIGN PATENT DOCUMENTS

| DE | 24 42 101 A1 | 3/1976 |
| DE | 26 44 922 | 4/1978 |
| DE | 39 11 433 A1 | 10/1990 |
| DE | 103 37975 A1 | 4/2005 |
| EP | 0316 792 B1 | 5/1989 |
| EP | 0675 142 A1 | 10/1995 |
| EP | 1 110 981 A | 6/2001 |
| WO | WO 2005/019288 A | 3/2005 |

* cited by examiner

*Primary Examiner*—Robert D. Harlan
(74) *Attorney, Agent, or Firm*—Fulbright & Jaworski L.L.P.

(57) ABSTRACT

Copolymers which are obtained by free radical copolymerization of a vinylic poly(alkylene oxide) compound (A) with an ethylenically unsaturated monomer compound (B), and the use thereof as dispersants for aqueous solid suspensions, in particular hydraulic binders based on cement, lime, gypsum and anhydrite, are described. With very good water reduction power, the copolymers according to the invention scarcely retard the hardening of the concrete and ensure long processability of the concrete.

17 Claims, No Drawings

PHOSPHORUS-CONTAINING COPOLYMERS, METHOD FOR THE PRODUCTION THEREOF, AND USE THEREOF

This is a §371 of PCT/EP2006/001694 filed Feb. 24, 2006, which claims priority from German Patent Application Nos. 10 2005 008 671.3 filed Feb. 25, 2005.

The present invention relates to phosphorus-containing copolymers, methods for the production thereof and the use thereof as admixtures for aqueous solid suspensions based on mineral binders or other inorganic or organic particles.

The copolymers according to the invention are outstandingly suitable in particular as admixtures for hydraulic binders, in particular cement, but also lime, gypsum and anhydrite. The use of these copolymers leads to a substantial improvement in the building materials produced therefrom during the processing or hardening process. Furthermore, the polymers according to the invention are also very suitable for the dispersing of other inorganic particles, such as metal powders, in water or organic solvents.

In aqueous suspensions of pulverulent inorganic or organic substances, such as hydraulic binders (cement, lime, gypsum or anhydrite), rock flour, silicate flour, chalk, clays, porcelain slips, talc, pigments, carbon black and metal or plastic powders, admixtures in the form of dispersants are often added to improve their processability, i.e. kneadability, flowability, sprayability, spreadability or pumpability. By adsorption onto the surfaces of the particles, these admixtures are capable of breaking up agglomerates and of dispersing the particles formed. Particularly in the case of highly concentrated dispersions, this leads to a substantial improvement in the processability.

In the preparation of the building material mixtures which contain hydraulic binders, such as cement, lime, gypsum or anhydride, this effect can be particularly advantageously utilized since otherwise substantially more water would be necessary than would be required for the subsequent hydration or hardening process, in order to achieve a processable consistency. The water gradually evaporating after hardening leaves behind cavities which have a significant adverse effect on the mechanical strengths and stabilities of the structures.

In order to reduce the proportion of water which is in excess for the hydration and/or to optimize the processability at a predetermined water/binder ratio, admixtures which are generally referred to as superplasticizers are used.

The superplasticizers still most frequently used are polycondensates based on naphthalenesulfonic acids or alkyl-naphthalenesulfonic acids (cf. EP-A 214 412) and melamine-formaldehyde resins which contain sulfo groups (cf. DE-PS 16 71 017).

However, these superplasticizers have the disadvantage that their good plasticizing effect—in particular in concrete construction—persists only over a relatively short time span even in relatively high doses. This decrease in the flowability of concrete mixes is also referred to as "slump loss". It leads to problems particularly when there are relatively large time spans between the production of the concrete and incorporation thereof, as often occurs as a result of long transport or conveying distances.

Furthermore, the liberation of the toxic formaldehyde present as a result of production can lead to considerable contaminations in terms of occupational hygiene in the case of interior use (production of prefabricated concrete parts or drying of sandwich-type gypsum plasterboard) or use in mining or tunnel construction.

In order to overcome these disadvantages, formaldehyde-free superplasticizers based on maleic acid monoesters and styrene were also developed (cf. EP-A 306 449). Although a high dispersing power can be ensured over a sufficient period (little slump loss) with these admixtures, these positive properties are rapidly lost on storage of the aqueous preparations of these superplasticizers. The short shelf-life of these superplasticizer solutions is due to the ready hydrolyzability of the maleic acid monoesters.

In order to increase the shelf-life, various hydrolysis-stable superplasticizers were developed. All these superplasticizers are copolymers of ethylenically unsaturated carboxylic acids (such as, for example, acrylic acid, methacrylic acid or maleic acid or salts thereof) and poly(alkylene oxides) having a polymerizable terminal group (such as, for example, methacrylates, allyl ethers or vinyl ethers). Incorporation of these long-chain monomers into a polymer chain leads to polymers having a comb-like structure (cf. U.S. Pat. No. 5,707,445, EP 1 110 981 A2, EP 1 142 847 A2).

These comb polymers are distinguished not only by a long shelf-life but also by substantially improved efficiency in comparison with superplasticizers based on lignin, naphthalene or melamine condensate.

According to a widely accepted theory, the efficiency of the superplasticizers is based on two different effects. Firstly, the negatively charged acid groups of the superplasticizer are adsorbed on the cement particle surface positively charged by calcium ions. The electrostatic double layer thus formed (zeta potential) leads to an electrostatic repulsion between the particles. However, the repulsive forces caused by the zeta potentials have only short ranges (cf. H. Uchikawa, Cement and Concrete Research 27 [1] 37-50 (1997)).

Furthermore, however, the physical presence of the adsorbed superplasticizer also prevents the surfaces of the cement particles from coming into direct contact with one another. This steric repulsive effect is drastically enhanced by the non-adsorbed side chains of the abovementioned comb polymers (cf. K. Yoshioka, J. Am. Ceram. Soc. 80 [10] 2667-71 (1997)). It is obvious that the sterically caused repulsive effect can be influenced both by the length of the side chains and by the number of side chains per main chain. On the other hand an excessively high side chain density or length can hinder the adsorption on the cement particle surface.

In the course of the last decade, numerous plasticizers based on polycarboxylic acid ethers have been developed. It has been found that the polymers differ not only with regard to their water reduction power but that optimization in favor of particularly good retention of slump is also possible. The latter is achieved by a particularly high density of side chains. However, these polymers then have a substantially lower water reduction power, since the high side chain density hinders the adsorption of the superplasticizer onto the cement particles. To date, all attempts to combine the two desired properties—good water reduction and long processability—in one polycarboxylate-ether polymer have met with little success. By adding retardants, the duration of processability can be increased even in concretes having a greatly reduced proportion of water, but the early strength then suffers greatly thereby. However, high early strength is indispensable for economic reasons, in order to ensure rapid progress of construction.

It was therefore the object of the present invention to develop copolymers which do not have said disadvantages of the prior art but, with very good water reduction, scarcely retard the hardening of the concrete and nevertheless ensure long processability of the concrete.

This object was achieved, according to the invention, by the copolymers as claimed in claim 1.

It has surprisingly been found that copolymers which have the properties described above are obtained by copolymerization of unsaturated compounds which contain phosphonate groups and/or phosphoric acid ester groups with unsaturated polyalkylene oxide derivatives.

The superplasticizers according to the invention are prepared by free radical polymerization of a vinylic poly(alkylene oxide) compound (A) with an ethylenically unsaturated monomer compound (B).

The poly(alkylene oxide) compounds (A) used according to the invention correspond here to the general formula (I)

$R^1$ has the following meaning: a hydrogen atom, an aliphatic hydrocarbon radical having 1 to 20 C atoms, a cycloaliphatic radical having 5 to 12 C atoms or an aryl radical having 6 to 14 C atoms, which may also be optionally substituted. The following is applicable for the indices: m=2 to 4 and n=1 to 250, it being possible for m preferably to assume the values 2 or 3 and n preferably values from 5 to 250 and even more preferably values from 20 to 135.

Cyclopentyl or cyclohexyl radicals are to be regarded as preferred cycloalkyl radicals, and phenyl or naphthyl radicals which may also be substituted in particular by hydroxyl, carboxyl or sulfo groups are to be regarded as preferred aryl radicals.

The building block Z in formula (I) may have the following meanings in the context of the present invention:

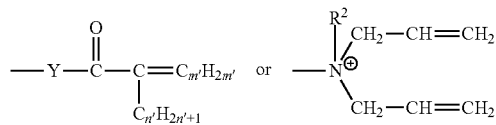

Here, m may be 1 to 4 and n 0, 1 or 2, m preferably being 1 and n 0 or 1. Y may be O or $NR^2$ and $R^2$ may be H, an alkyl radical having 1 to 12 C atoms or an aryl radical having 6 to 14 C atoms and $—C_mH_{2m}—(—O—C_mH_{2m})_{n-1}—OR^1$, $R^1$, m and n having the abovementioned meaning. Particularly preferably, $R^2$ are H, $CH_3$ or $C_2H_5$.

In the present invention, compounds of the general formula (II) can be used as ethylenically unsaturated monomer compound (B):

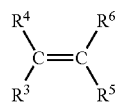

Here, $R^3$, $R^4$ and $R^5$, independently of one another, correspond to a hydrogen atom or a $C_1$-$C_4$-alkyl group, or $C_6$-$C_{10}$-aryl group (which may also optionally be substituted by hydroxyl, carboxyl, and/or $C_1$-$C_4$-alkyl groups).

Here, $R^6$ may be the following radicals:
—$PO_3H_2$ phosphonic acid group,
—$CH_2$—$N(CH_2$—$PO_3H_2)_2$ methyleneamine-N,N-bismethylenephosphonic acid,

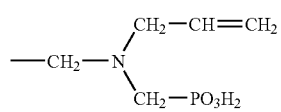

methyleneamine-N-allyl-N-methylenephosphonic acid,
—$(CH_2)_x$—$PO_3H_2$ (x=1-12) $C_1$-$C_{12}$-alkylphosphonic acid,
—$(CH_2)_x$—O—$PO(OH)_2$ (x=1-12) $C_1$-$C_{12}$-hydroxyalkylphosphoric acid ester,
—CO—O—$(CH_2)_x$—$PO_3H_2$ (x=1-12) carboxylic acid ester of a $C_1$-$C_{12}$-hydroxyalkylphosphonic acid,
—CO—O—$(CH_2)_x$—O—$PO(OH)_2$ (x=1-12) carboxylic acid ester of a $C_1$-$C_{12}$-hydroxyalkylphosphoric acid ester,
—CO—O—$(C_{n''}H_{2n''}O)_x$—$PO_3H_2$ (n''=2 or 3, x=1-12) carboxylic acid ester of a (poly)alkylene glycol phosphonic acid,
—CO—NH—$(C_{n''}H_{2n''}O)_x$—$PO_3H_2$ (n''=2 or 3, x=1-12) carboxamide of an amino(poly)alkylene glycol phosphonic acid,
—CO—O—$CH_2$—CH(OH)—$CH_2$O—$PO_3H_2$ carboxylic acid ester of a propanediolphosphonic acid,
—CO—O—$(CH_2)_x$—N—$(CH_2$—$PO_3H_2)_2$ (x=1-12) carboxylic acid ester of a bismethylphosphonated $C_1$-$C_{12}$-hydroxyalkylamine,

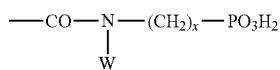

(x=1-12) carboxamide of a $C_1$-$C_{12}$-aminoalkylphosphonic acid (where W=H or —$(CH_2)_x$—$PO_3H_2$),

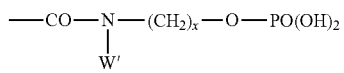

(x=1-12) carboxamide of $C_1$-$C_{12}$-aminoalkylphosphoric acid ester (W'=H, —$(CH_2)_x$—$PO(OH)_2$),

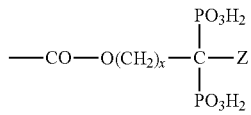

(Z=H, OH, $NH_2$) carboxylic acid ester of a bisphosphonated $C_1$-$C_{12}$-hydroxyalkyl nitrile, ester or aldehyde,

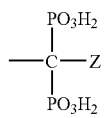

(Z=H, OH, $NH_2$) bisphosphonates having H, OH or $NH_2$ terminal groups,
—Ar—$PO_3H_2$ (Ar=$C_6$-$C_{10}$) $C_6$-$C_{10}$-arylphosphonic acid,
—Ar—O—$PO(OH)_2$ (Ar=$C_6$-$C_{10}$) $C_6$-$C_{10}$-arylphosphoric acid ester,
—CO—O—Ar—$PO_3H_2$ (Ar=$C_6$-$C_{10}$) carboxylic acid ester of a $C_6$-$C_{10}$-hydroxyarylphosphonic acid,
—CO—O—Ar—O—$PO(OH)_2$ (Ar=$C_6$-$C_{10}$) carboxylic acid ester of a $C_6$-$C_{10}$-hydroxyarylphosphoric acid ester,
—CO—NH—Ar—$PO_3H_2$ (Ar=$C_6$-$C_{10}$) carboxamide of a $C_6$-$C_{10}$-aminoarylphosphonic acid,
—CO—NH—Ar—O—$PO(OH)_2$ (Ar=$C_6$-$C_{10}$) carboxamide of a $C_6$-$C_{10}$-aminoarylphosphoric acid ester It is directly possible within the scope of the present invention for the aromatic radicals Ar also to have OH, $C_1$-$C_4$-alkyl or COOH substituents. In addition, it is possible for the phosphoric acids or acidic phosphate esters to be present in the form of their alkali metal (sodium, potassium), alkaline earth metal (calcium, magnesium) or ammonium salts.

The following phosphorus-containing monomer compounds are preferably used for the copolymers prepared according to the invention:

hydroxyalkyl acrylates or hydroxyalkyl methacrylates whose OH group is esterified with phosphonic acid, hydroxyalkylmaleamides or -imides whose OH group is esterified with phosphonic acid, and vinylphosphonic acid.

The copolymers according to the invention may have molar ratios of the vinylic poly(alkylene oxide) compound (A) and the ethylenically unsaturated monomer compound (B) of from 1:0.01 to 1:100. However, ratios of from 1:0.1 to 1:50 are preferred, ratios of from 1:0.5 to 1:10 are particularly preferred and ratios of from 1:0.5 to 1:3 are very particularly preferred.

The copolymers according to the invention are in particular water-soluble copolymers. They preferably have a solubility at 20° C. in g/l of at least 3, more preferably of at least 5, even more preferably of at least 10 and most preferably of at least 50 or of at least 100.

It is possible within the scope of the present invention for the copolymers additionally to contain from 0% to 70% by weight, based on the sum of the components (A) and (B), of an ethylenically unsaturated monomer compound (C) of the general formula (III)

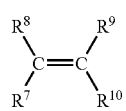

(III)

in which $R^7$ is H, $CH_3$, COOM, $COOR^{11}$, $CONR^{11}R^{11}$, $R^8$ is H, a $C_6$-$C_{14}$-aryl radical optionally substituted by hydroxyl, carboxyl or $C_1$-$C_4$-alkyl groups, $R^9$ is H, $CH_3$ or $CH_2$—$COOR^{11}$, $R^{10}$ is H, $CH_3$, COOM, $COOR^{11}$, a $C_6$-$C_{14}$-aryl radical optionally substituted by hydroxyl, carboxyl or $C_1$-$C_4$-alkyl groups, or $OR^{12}$, $SO_3M$, CONH—$R^{13}$—$SO_3M$, $R^{11}$ is H, $C_1$-$C_{12}$-alkyl, $C_1$-$C_{12}$-hydroxyalkyl, —$(CH_2)_x$—$SO_3M$, —$C_mH_{2m}$—(O—$C_mH_{2m}$)$_{n-1}$$OR^1$, $R^{12}$ is acetyl, $R^{13}$ is a linear or branched $C_1$-$C_6$-alkylene radical, M is H, alkali metal, alkaline earth metal or ammonium, $R^7$ and $R^{10}$ together may be O—CO—O and $R^1$, m, n and x have the abovementioned meaning.

The copolymers according to the invention are prepared by means of free radical polymerization, by methods which are known to the person skilled in the art in the area of polymerization. The preferred solvent for the polymerization is water. The generation of free radicals can be effected either by thermal decomposition of suitable azo initiators (e.g. 2,2'-azobis(2-methylpropionamidine) dihydrochloride (CAS 2997-92-4), 2,2'-azobis[2-(2-imidazolin-2-yl)propane]dihydrochloride (CAS 27776-21-2) or 4,4'-azobis[4-cyanopentanoic acid] (CAS 2638-94-0), photochemically or by use of a redox system. A redox system comprising hydrogen peroxide, iron (III) sulfate and Rongalit has proven particularly useful here.

In the case of the azo initiators, the reaction temperatures are from 30° C. to 150° C., preferably from 40° C. to 100° C. In the case of the production of free radicals photochemically or by means of a redox system, the reaction temperatures may be from −15° C. to 150° C.; temperatures from −5° C. to 100° C. are preferred but temperatures from 0° C. to 30° C. are very particularly preferred. Depending on reactivity, the monomers can either be completely initially introduced before the beginning of the polymerization or metered in in the course of the polymerization.

If those phosphorus-containing monomers which tend to undergo homopolymerization and moreover also have a higher reactivity than the macromonomers are used, they should be metered in in the course of the polymerization in such a way that their monomer concentrations remain approximately constant. Otherwise, the polymer composition would change greatly in the course of the polymerization.

The present invention furthermore relates to the use of the copolymers according to the invention as dispersants for aqueous solid suspensions, the corresponding copolymers being used in an amount of from 0.01 to 5% by weight, based on the respective solid suspension.

It is possible within the scope of the present invention for the corresponding solid suspension to contain organic or inorganic particles which are selected from the group consisting of rock flour, silicate flour, chalk, clays, porcelain slips, talc, pigments, carbon black and metal and plastic powder.

The copolymers according to the invention are particularly preferred for hydraulic binder suspensions based on cement, lime, gypsum and anhydrite. With very good water reduction power, the copolymers according to the invention thus scarcely retard the hardening of the concrete and ensure long processability of the concrete.

The following examples are intended to illustrate the invention in more detail.

EXAMPLES

A General Methods for the Synthesis of Methacrylate-Based Dispersants Having Phosphoric Acid Ester Groups Variant A: Redox Initiation A thermostatable 1000 ml double-wall reactor is equipped with a KPG stirrer, a nitrogen inlet tube and a metering apparatus for hydrogen peroxide.

The monomers (amounts according to Table 1) are initially introduced together with 10 mol % of regulator (e.g. mercaptopropionic acid, mercaptoethanol or sodium phosphite), 30 mol % of reducing agent (e.g. Rongalit) and 0.2 mol % of $FeSO_4*H_2O$ (based in each case on the molar amount of the monomers) into the double-wall reactor. In order to prevent the viscosity from increasing too greatly in the course of the polymerization, water is now added in an amount such that an approx. 40-50% strength monomer solution forms. This solution is made oxygen-free by passing through an inert gas (e.g. nitrogen) and is thermostated at 15° C.

Thereafter, the pH is adjusted to about 2-3.

In order to start the reaction, a mixture of 1 g of hydrogen peroxide (30% strength) and 49 g of water is now pumped via the metering apparatus into the double-wall reactor over a period of 2 hours. (Perfusor pumps from the medical sector permit particularly exact control of the metering rate.)

Stirring is effected for a further hour and the pH is then adjusted to 7. The polymer solution thus obtained is ready for use.

Variant B: Use of Azo Initiators

A thermostatable 1000 ml double-wall reactor is equipped with a KPG stirrer and nitrogen inlet tube.

The monomers (amounts according to Table 1) are initially introduced together with 0.2 mol % of VAZO 44 (water-soluble azo initiator) and 5 mol % of regulator (e.g. mercaptopropionic acid, mercaptoethanol or sodium phosphite) into the double-wall reactor. In order to prevent the viscosity from increasing too greatly in the course of the polymerization, water is added in an amount such that an approx. 40-50% strength monomer solution forms. This solution is made oxygen-free by passing through an inert gas (e.g. nitrogen) and is adjusted to pH 2-3.

Thereafter, heating to 90° C. is effected. This temperature is maintained over a period of 3 hours. After cooling, the pH is adjusted to 7. The polymer solution thus obtained is ready for use.

TABLE 1

| No. | Example | MPEG-MA MW | MPEG-MA [mol] | EGMAP [mol] | MAA [mol] | HEMA [mol] | Variant A | Variant B | $M_n$ (GPC) [g/mol] |
|---|---|---|---|---|---|---|---|---|---|
| 1 | 1 | 500 | 0.2 | 0.12 | 0 | 0 | X | | 21 400 |
| 2 | 2 | 500 | 0.2 | 0.06 | 0.06 | 0 | X | | 22 100 |
| 3 | 3 | 750 | 0.2 | 0.12 | 0 | 0 | X | | 23 070 |
| 4 | 4 | 750 | 0.2 | 0.16 | 0 | 0 | X | | 22 120 |
| 5 | 5 | 1100 | 0.15 | 0.15 | 0 | 0 | X | | 27 700 |
| 6 | 6 | 1100 | 0.15 | 0.12 | 0 | 0 | X | | 31 800 |
| 7 | 7 | 2000 | 0.1 | 0.1 | 0 | 0 | X | | 45 220 |
| 8 | 8 | 2000 | 0.1 | 0.12 | 0 | 0 | X | | 41 900 |
| 9 | 9 | 2000 | 0.1 | 0.06 | 0.06 | 0 | X | | 49 320 |
| 10 | 10 | 2000 | 0.1 | 0.12 | 0 | 0.2 | X | | 43 440 |
| 11 | 11 | 2000 | 0.1 | 0.1 | 0 | 0.3 | X | | 45 910 |
| 12 | 12 | 1100 | 0.15 | 0.15 | 0 | 0 | | X | 35 330 |
| 13 | 13 | 2000 | 0.1 | 0.12 | 0 | 0 | | X | 52 220 |
| 14 | 14 | 5000 | 0.05 | 0.1 | 0 | 0 | X | | 61 780 |
| 15 | 15 | 5000 | 0.05 | 0.1 | 0.05 | 0 | X | | 69 110 |
| 16 | 16 | 5000 | 0.05 | 0.1 | 0.05 | 0.2 | X | | 70 050 |
| 17 | 17 | 5000 | 0.05 | 0.1 | 0.05 | 0.4 | X | | 68 510 |
| 18 | 18 | 5000 | 0.05 | 0.15 | 0 | 0 | | X | 72 300 |
| 19 | 19 | 10000 | 0.025 | 0.1 | 0 | 0.2 | X | | 66 370 |
| 20 | 20 | 10000 | 0.025 | 0.1 | 0 | 0.4 | X | | 71 600 |

MPEG-MA = polyethylene glycol monomethyl ether methacrylate,
EGMAP = ethylene glycol methacrylate phosphate,
MAA = methacrylic acid,
HEMA = hydroxyethyl methacrylate Variant C: Use of N-polyethylene glycol-N,N,N-diallylmethylammonium Sulfate A thermostatable 1000 ml double-wall reactor is equipped with a KPG stirrer, nitrogen inlet tube and two metering apparatuses. Here, one serves for metering hydrogen peroxide and the other for metering the monomers.

0.1 mol of polyethylene glycol-N,N,N-diallylmethylammonium sulfate is initially introduced into the double-wall reactor and 30 mol % of reducing agent (e.g. Rongalit) and 0.2 mol % of $FeSO_4 \cdot H_2O$ (based in each case on the molar amount of the monomers) are added. In order to prevent the viscosity from increasing too greatly in the course of the polymerization, water is now added in an amount such that an approx. 40-50% strength monomer solution forms. This solution is made oxygen-free by passing through an inert gas (e.g. nitrogen) and is thermostated at 15° C. Thereafter, the pH is adjusted to about 2-3.

In order to start the reaction, a mixture of 3 g of hydrogen peroxide (30% strength) and 47 g of water is now pumped via one metering apparatus into the double-wall reactor over a period of 2 hours. At the same time, the comonomers (amounts according to Table 2) are pumped in by means of the second metering apparatus over a period of one hour. (Perfusor pumps from the medical sector permit particularly exact control of the metering rate.)

Stirring is effected for a further hour and thereafter the pH is adjusted to 7. The polymer solution thus obtained is ready for use.

TABLE 2

| No. | Example No. | N-PEG-N,N,N-diallylmethyl-ammonium sulfate MW | N-PEG-N,N,N-diallylmethyl-ammonium sulfate [mol] | EGMAP [mol] | HEMA [mol] | $M_n$ (GPC) [g/mol] |
|---|---|---|---|---|---|---|
| 1 | 21 | 2000 | 0.1 | 0.1 | 0 | 18 110 |
| 2 | 22 | 2000 | 0.1 | 0.12 | 0 | 20 050 |
| 3 | 23 | 2000 | 0.1 | 0.12 | 0.12 | 25 510 |
| 4 | 24 | 2000 | 0.1 | 0.12 | 0.24 | 28 300 |

EGMAP = ethylene glycol methacrylate phosphate,
HEMA = hydroxyethyl methacrylate B Mortar Tests for Determining the Water Reduction Power and Retention of Flowability Over a Period of 90 Min The test was carried out according to (DIN EN 1015-3).

TABLE 3

Table 3: Results of the mortar slump tests with CEM I 42.5 R v.02.03 Karlstadt. Rilem mixer

| No. | Example | Dose [g/kg cement] | w/c | Slump [cm] 10 min | Slump [cm] 30 min | Slump [cm] 60 min | Slump [cm] 90 min |
|---|---|---|---|---|---|---|---|
| 1 | Reference | 0 | 0.57 | 24.7 | 23.4 | 23.0 | 22.5 |
| 2 | 1 | 2 | 0.48 | 24.3 | 23.1 | 21.2 | 20.8 |
| 3 | 2 | 2 | 0.49 | 23.8 | 22.9 | 22.3 | 21.1 |
| 4 | 3 | 2 | 0.44 | 23.2 | 22.8 | 21.4 | 20.6 |
| 5 | 4 | 2 | 0.44 | 23.7 | 22.1 | 21.4 | 21.2 |
| 6 | 5 | 2 | 0.44 | 25.8 | 23.6 | 22.2 | 21.0 |
| 7 | 6 | 2 | 0.44 | 25.1 | 24.5 | 22.3 | 21.7 |
| 8 | 7 | 2 | 0.42 | 24.6 | 24.9 | 24 | 23.5 |
| 9 | 8 | 2 | 0.41 | 24.1 | 23.8 | 23.4 | 22.9 |
| 10 | 9 | 2 | 0.44 | 23.6 | 22.2 | 21.5 | 21.1 |

TABLE 3-continued

Table 3: Results of the mortar slump tests with
CEM I 42.5 R v.02.03 Karlstadt. Rilem mixer

| No. | Example | Dose [g/kg cement] | w/c | Slump [cm] 10 min | 30 min | 60 min | 90 min |
|---|---|---|---|---|---|---|---|
| 11 | 10 | 2 | 0.43 | 23.9 | 23.1 | 22.6 | 22.3 |
| 12 | 11 | 2 | 0.43 | 23.5 | 23.2 | 22.5 | 22.5 |
| 13 | 12 | 2 | 0.44 | 25.3 | 23.8 | 22.5 | 20.8 |
| 14 | 13 | 2 | 0.41 | 23.9 | 23.4 | 23.2 | 23.0 |
| 15 | 14 | 2 | 0.38 | 25.1 | 23.0 | 22.2 | 19.9 |
| 16 | 15 | 2 | 0.37 | 24.5 | 22.9 | 21.0 | 19.7 |
| 17 | 16 | 2 | 0.41 | 23.8 | 22.9 | 22.2 | 21.5 |
| 18 | 17 | 2 | 0.42 | 24.3 | 23.9 | 23.1 | 22.3 |
| 19 | 18 | 2 | 0.365 | 26.0 | 22.9 | 20.6 | 19.9 |
| 20 | 19 | 2 | 0.43 | 23.3 | 22.9 | 22.1 | 21.3 |
| 21 | 20 | 2 | 0.45 | 24.1 | 23.6 | 22.3 | 21.0 |
| 22 | 21 | 2 | 0.46 | 24.6 | 24.9 | 24 | 23.5 |
| 23 | 22 | 2 | 0.45 | 24.2 | 23.6 | 23.0 | 22.4 |
| 24 | 23 | 2 | 0.48 | 23.6 | 23.2 | 22.5 | 21.9 |
| 25 | 24 | 2 | 0.49 | 23.9 | 23.7 | 23.1 | 22.8 |

From Table 3 it is evident that the water requirement for plasticizing a mortar to a certain slump can be drastically reduced by the addition of the polymers according to the invention. If the addition of a superplasticizer is dispensed with (entry 1 in Table 3), a water/cement ratio of 0.57 is required in order to achieve a slump of 24.7 cm. In the course of 90 min. the slump decreases to 22.5 cm since the mortar becomes stiffer owing to the incipient hydration process.

In the best case (entry 19, Table 3), it was possible by addition of the superplasticizer 18 according to the invention to reduce the water requirement by 36% and nevertheless to achieve a consistency more fluid than the reference (entry 1, Table 3) (slump 26 cm compared with 24.7 cm in the case of the reference mortar). However, the good plasticizing effect declined rapidly after only 30 min. By a suitable choice of the monomers or monomer ratios, it is possible, however, to reduce the water requirement substantially and nevertheless to achieve good retention of the consistency over 90 min. (Table 3, entries 7, 11 and 13).

C Concrete Tests for Determining the Water Reduction Power and Retention of Flowability Over a Period of 90 Min The tests were carried out according to DIN EN 206-1, DIN EN 12350-2 and DIN EN 12350-5.

Cement: Bernburg CEM I 42.5 R, 320 kg, filler: 50 kg of limestone flour, dose: 0.2% by weight, based on cement, temperature: 20° C.

In this test series, the water/cement ratio was chosen so that a uniform slump value of about 20-21 cm was achieved for all samples after the end of the mixing process.

The slump value is a measure of the extent to which the concrete cake collapses after the metal cone has been raised (height difference between the upper edge of the metal cone and the height of the concrete cake after removal of the metal mold). The slump flow corresponds to the base diameter of the concrete cone after the collapse.

The slump is obtained by shaking the slump table, according to the above-mentioned DIN methods, by raising it and setting it down 10 times. The shear forces occurring as a result of the "tapping" produce a further slump of the concrete. The diameter of the concrete cake after the "tapping" is referred to as slump.

As in mortar, the polymers according to the invention have a substantial plasticizing effect in concrete too. The water requirement could be reduced from w/c=0.6 to 0.4 (Table 4, entry 9) compared with the concrete without added superplasticizer (Table 4, entry 1).

However, the processability of the concrete decreases substantially over a period of only one hour a very low w/c values.

The results of the concrete tests are summarized in Table 4:

TABLE 4

Concrete tests

| No. | Example | w/c | Dos. | Slump [cm] after [min] 0 | 10 | 40 | 60 | Slump flow [cm] after [min] 0 | 10 | 40 | 60 | Slump [cm] after [min] 0 | 10 | 40 | 60 |
|---|---|---|---|---|---|---|---|---|---|---|---|---|---|---|---|
| 1 | Reference | 0.60 | — | 21 | 21 | 17 | 17 | 33 | 31 | 26 | 25 | 61 | 59.5 | 56 | 54 |
| 2 | 5 | 0.49 | 0.20% | 21 | 20 | 19 | 18 | 36 | 36 | 34 | 28 | 59.5 | 58.5 | 54.5 | 52 |
| 3 | 6 | 0.52 | 0.20% | 21 | 23 | 22.5 | 22 | 35 | 40 | 38 | 34 | 58 | 61 | 59 | 56 |
| 4 | 7 | 0.50 | 0.20% | 21 | 22 | 20.5 | 19 | 36 | 38 | 35 | 31 | 59 | 60 | 57 | 55 |
| 5 | 8 | 0.46 | 0.20% | 21 | 21 | 18 | 17 | 36 | 37 | 31 | 26 | 59.5 | 58 | 52.5 | 48.5 |
| 6 | 11 | 0.50 | 0.20% | 21 | 21 | 20.0 | 19 | 37 | 36 | 36 | 31 | 61 | 60 | 59 | 55 |
| 7 | 13 | 0.44 | 0.20% | 20 | 19 | 18 | 17 | 36 | 34 | 27 | 23 | 58 | 56 | 52.5 | 48 |
| 8 | 22 | 0.45 | 0.20% | 22 | 20 | 19 | 17 | 37 | 36 | 32 | 25 | 59.5 | 58 | 55 | 50 |
| 9 | 14 | 0.40 | 0.20% | 20 | 18 | 6.5 | — | 35 | 31 | 20 | — | 54 | 51 | 39 | — |
| 10 | 16 | 0.42 | 0.20% | 21 | 20 | 16 | 9 | 35 | 34 | 25 | 20 | 59 | 58 | 49 | 46 |
| 11 | 19 | 0.45 | 0.20% | 21 | 20 | 18 | 17 | 35 | 33 | 28 | 26 | 59 | 58.5 | 51.5 | 48 |

Remarkably a greatly retardant effect, as known in the case of phosphates which are not bound to polymers, could not be observed.

The invention claimed is:

1. A copolymer obtainable by the free radical copolymerization of a vinylic poly(alkylene oxide) compound (A) of the general formula (I),

in which $R^1$ is hydrogen, a $C_1$-$C_{20}$-alkyl radical, a $C_5$-$C_{12}$-cycloalkyl radical, an optionally substituted $C_6$-$C_{14}$-aryl radical, m is from 2 to 4, n is from 1 to 250,

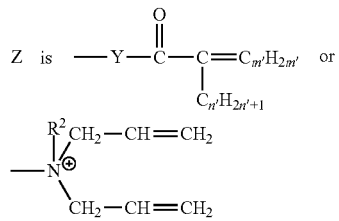

Y is O or $NR^2$, $R^2$ is hydrogen, $C_1$-$C_{12}$-alkyl radical, $C_6$-$C_{14}$-aryl radical, $-C_mH_{2m}-(O-C_mH_{2m})_{n-1}OR^1$, m' is from 1 to 4, n' is from 0 to 2, with an ethylenically unsaturated monomer compound (B) of the general formula (II)

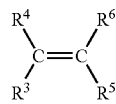

in which $R^3$, $R^4$ and $R^5$, independently of one another, are hydrogen, a $C_1$-$C_4$-alkyl radical or an optionally substituted $C_6$-$C_{14}$-aryl radical and $R^6$ is $-PO_3H_2$,
$-CH_2-N(CH_2-PO_3H_2)_2$,

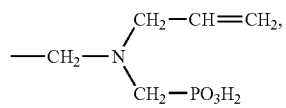

$-(CH_2)_x-PO_3H_2$,
$-(CH_2)_x-O-PO(OH)_2$,
$-CO-O-(CH_2)_x-PO_3H_2$,
$-CO-O-(CH_2)_x-O-PO(OH)_2$,
$-CO-O-(C_{n''}H_{2n''}O)_x-PO_3H_2$,
$-CO-NH-(C_{n''}H_{2n''}O)_x-PO_3H_2$,
$-CO-O-CH_2-CH(OH)-CH_2O-PO_3H_2$,
$-CO-O-(CH_2)_x-N(CH_2-PO_3H_2)_2$,

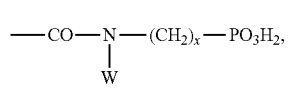

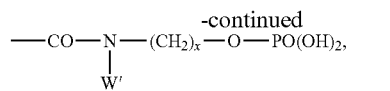

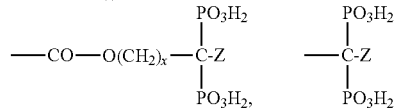

$-Ar-PO_3H_2$,
$-Ar-O-PO(OH)_2$,
$-CO-O-Ar-PO_3H_2$,
$-CO-O-Ar-O-PO(OH)_2$,
$-CO-NH-Ar-PO_3H_2$,
$-CO-NH-Ar-O-PO(OH)_2$,

W is H, $-(CH_2)_x-PO_3H_2$,

W' is H, $-(CH_2)_x-O-PO(OH)_2$,

Z is H, OH, $NH_2$,

Ar is a $C_6$-$C_{10}$-aryl radical optionally substituted by H, $C_1$-$C_4$-alkyl or COOH groups, n" is 2 or 3, x is from 1 to 12.

2. The copolymers as claimed in claim 1, wherein in formula (I), the aryl radicals for $R^1$ also carry hydroxyl, carboxyl or sulfo groups.

3. The copolymer as claimed in claim 1, wherein in the formula (I), m is 2 or 3 and n is from 5 to 250.

4. The copolymer as claimed in claim 1, wherein in formula (I), m' is 1 and n' is 0 or 1.

5. The copolymer as claimed in claim 1, wherein in formula (I), $R^2$ is H, $CH_3$ or $C_2H_5$.

6. The copolymer as claimed in claim 1, wherein in formula (I), the aryl radicals for $R^3$, $R^4$ and $R^5$ also have hydroxyl, carboxyl or $C_1$-$C_4$-alkyl substituents.

7. The copolymer as claimed in claim 1, wherein the phosphonic acid or acidic phosphate ester group are present in the form of alkali metal, alkaline earth metal or ammonium salts.

8. The copolymer as claimed in claim 1, wherein the molar ratios of the vinylic poly(alkylene oxide) compound (A) to the ethylenically unsaturated monomer compound (B) were adjusted to 1:0.01 to 1:100.

9. The copolymer as claimed in claim 1, containing from 0 to 70% by weight, based on the sum of the components (A) and (B), of an ethylenically unsaturated monomer compound (C) of the general formula (III)

in which $R^7$ is H, $CH_3$, COOM, $COOR^{11}$, $CONR^{11}R^{11}$, $R^8$ is H, a $C_6$-$C_{14}$-aryl radical optionally substituted by hydroxyl, carboxyl or $C_1$-$C_4$-alkyl groups, $R^9$ is H, $CH_3$ or $CH_2-COOR^{11}$, $R^{10}$ is H, $CH_3$, COOM, $COOR^{11}$, a $C_6$-$C_{14}$-aryl radical optionally substituted by hydroxyl, carboxyl or $C_1$-$C_4$-alkyl groups, or $OR^{12}$, $SO_3M$, $CONH-R^{13}-SO_3M$, $R^{11}$ is H, $C_1$-$C_{12}$-alkyl, $C_1$-$C_{12}$-hydroxyalkyl, $-(CH_2)_x-SO_3M$, $-C_mH_{2m}-(O-C_mH_{2m})_{n-1}OR^1$, $R^{12}$ is acetyl, $R^{13}$ is a linear or branched $C_1$-$C_6$-alkylene radical, M is H, alkali metal, alkaline earth metal or ammonium, $R^7$ and $R^{10}$ together may be O—CO—O and
$R^1$, m, n and x have the abovementioned meaning.

10. The copolymer as claimed in claim 1, wherein the copolymer is water-soluble.

11. A process comprising preparing a copolymer as claimed in any of claim 1, by subjecting the vinylic poly(alkylene oxide) compound (A) and the ethylenically unsaturated monomer compound (B) to a free radical polymerization in the presence of suitable catalyst or initiator at from 30 to 150° C.

12. The process as claimed in claim 11, wherein the initiators used are azo initiators or redox systems.

13. The process as claimed in claim 11, wherein the polymerization is carried out in the temperature range from 40 to 100° C.

14. An aqueous solid suspension comprising the copolymer of claim 1 as a dispersant.

15. The aqueous solid suspension of claim 14, wherein the copolymer is present in an amount of from 0.01 to 5% by weight, based on the solid suspension.

16. The aqueous solid suspension of claim 11, wherein the solid suspension contains a hydraulic binder based on cement, lime, gypsum or anhydrite.

17. The aqueous solid suspension of claim 11, wherein the solid suspension contains an inorganic particle selected from the group consisting of a rock flour, a silicate flour, chalk, a clay, a porcelain slip, talc, a pigment, carbon black, a metal powder and a plastic powder.

* * * * *